United States Patent [19]

McNeilus et al.

[11] Patent Number: 5,018,755
[45] Date of Patent: May 28, 1991

[54] TAG AXLE FOR WORK VEHICLES

[75] Inventors: Garwin McNeilus, Dodge Center; Ronald E. Christenson, Kasson, both of Minn.

[73] Assignee: McNeilus Truck and Manufacturing, Inc., Dodge Center, Minn.

[21] Appl. No.: 469,175

[22] Filed: Jan. 24, 1990

[51] Int. Cl.⁵ .......................... B60P 1/00; B62D 61/12
[52] U.S. Cl. ................................ 280/81.1; 180/24.02; 280/704; 280/711; 280/DIG. 1
[58] Field of Search .................. 280/80.1, 81.1, 764.1, 280/767, 712, 686, 43.23, 704, 711, DIG. 1; 180/24.02

[56] References Cited

U.S. PATENT DOCUMENTS

| | | | |
|---|---|---|---|
| 2,490,311 | 12/1949 | Levesque du Rostu | 280/6.12 |
| 2,659,446 | 11/1953 | Willock | 180/24.02 |
| 3,002,469 | 10/1961 | Wanner | 280/80.1 |
| 3,610,653 | 10/1971 | Derrwaldt | 280/81.1 |
| 3,653,455 | 4/1972 | Hetteen | 280/80.1 |
| 3,784,221 | 1/1974 | Fraiser, Sr. | 280/712 |
| 3,903,977 | 9/1975 | Gillette | 280/80.1 |
| 3,915,470 | 10/1975 | Jansen | 280/676 |
| 3,936,070 | 2/1976 | Mandel | 280/686 |
| 4,063,779 | 12/1977 | Martin et al. | 280/686 |
| 4,146,243 | 3/1979 | Sims | 280/81.1 |
| 4,165,884 | 8/1979 | Allison et al. | 280/81.1 |
| 4,284,156 | 8/1981 | Carstensen et al. | 180/24.02 |
| 4,350,358 | 9/1982 | Ferris | 280/81.1 |
| 4,421,331 | 12/1983 | Ferris | 280/81.1 |
| 4,501,437 | 2/1985 | Becker | 280/704 |
| 4,553,773 | 11/1985 | Pierce | 280/676 |
| 4,614,247 | 9/1986 | Sullivan | 180/24.02 |
| 4,783,096 | 11/1988 | Ramsey et al. | 280/711 |

Primary Examiner—Richard A. Bertsch
Attorney, Agent, or Firm—Haugen and Nikolai

[57] ABSTRACT

The present invention is directed to a pneumatic system for (a) raising and lowering the tag axle assembly and (b) applying a variable downward force to the wheels of the tag axle assembly when the wheels are in their ground engaging position. This system disclosed is intended to be tied into the pneumatic brake system which comes standard on most heavy duty work vehicles. The entire system is also controllable from the vehicle's cab.

24 Claims, 14 Drawing Sheets

TAG AXLE FOR WORK VEHICLES

BACKGROUND OF THE INVENTION

The present invention relates to work vehicles having tag axle assemblies capable of being moved between a first position in which the wheels of the tag axle assembly are elevated and a second position in which said wheels engage the ground. More specifically, the present invention relates to a tag axle assembly specifically designed so that a variable load can be placed upon the wheels when the wheels are in the ground engaging position

BACKGROUND OF THE INVENTION

Tag axle assemblies are known in the art and are widely used on work vehicles. The use of tag axle assemblies make it possible for work vehicles to carry more weight and still meet regulations governing the weight work vehicles can legally carry over state and federal highways. In recent years, significant improvements have are shown in U.S. Pat. Nos. 4,848,783, 4,705,133, 4,762,421, 4,812,044, 4,631,919. While the principle of providing auxiliary tag axle assemblies is simple enough and the need for such devises is generally recognized, the obtainment of certain constructional and operational features has not been so readily achieved.

For example, extended reach tag axle assemblies in the past have generally incorporated an hydraulic cylinder with an hydraulic accumulator to provide the means to raise and lower the tag axle. While such systems have worked, they generally require additional hydraulic pumps, hoses, valves or cylinders not otherwise found on the work vehicle. Such systems have been overly complex, overly heavy, and require considerable maintenance. These systems all too often develope oil leakages in the hydraulic system. Many of these problems are avoided if air pressure rather than hydraulic pressure is used to raise and lower the tag axle assembly.

Prior art tag axle assemblies typically have not included means for providing a controllable downward force on the wheels of the assembly. Such means are particularly desirable when the vehicle is traveling off-road near a construction site. The terrain at such sites is typically very uneven including many bumps and depressions. A properly designed tag axle assembly must permit the downward force on the tag wheels to automatically be reduced to allow the raised grade to pass easily beneath the wheels when the tag wheels encounter any raised grade. Otherwise the truck could get hung up by a large bump. Similarly, when the tag wheels encounter a depression in the terrain, the downward travel of the tag wheels must be limited. The axle cannot be allowed to be lowered to a point where the vehicle or tag axle assembly would be damaged. Most importantly, the transitions from bump to depression must be handled smoothly to prevent sudden shock forces which could cause damage to the vehicle or the tag axle assembly.

The various embodiments of the present invention disclosed hereinafter meet the important objectives set forth above. First, all use pneumatic actuators rather than hydraulic actuators to raise and lower the tag axle assembly. Second, each of the embodiments uses a pneumatic spring to cause a variable downward force to be applied to the wheels of the tag axle assembly as they pass from normal ground level to either a higher grade or a lower grade. A complete understanding of the invention and the various embodiments will be derived from the following detailed descriptions of the preferred embodiments when read in conjunction with the appended drawings and claims.

DETAILED DESCRIPTION OF THE FIRST PREFERRED EMBODIMENT

Figure 1:
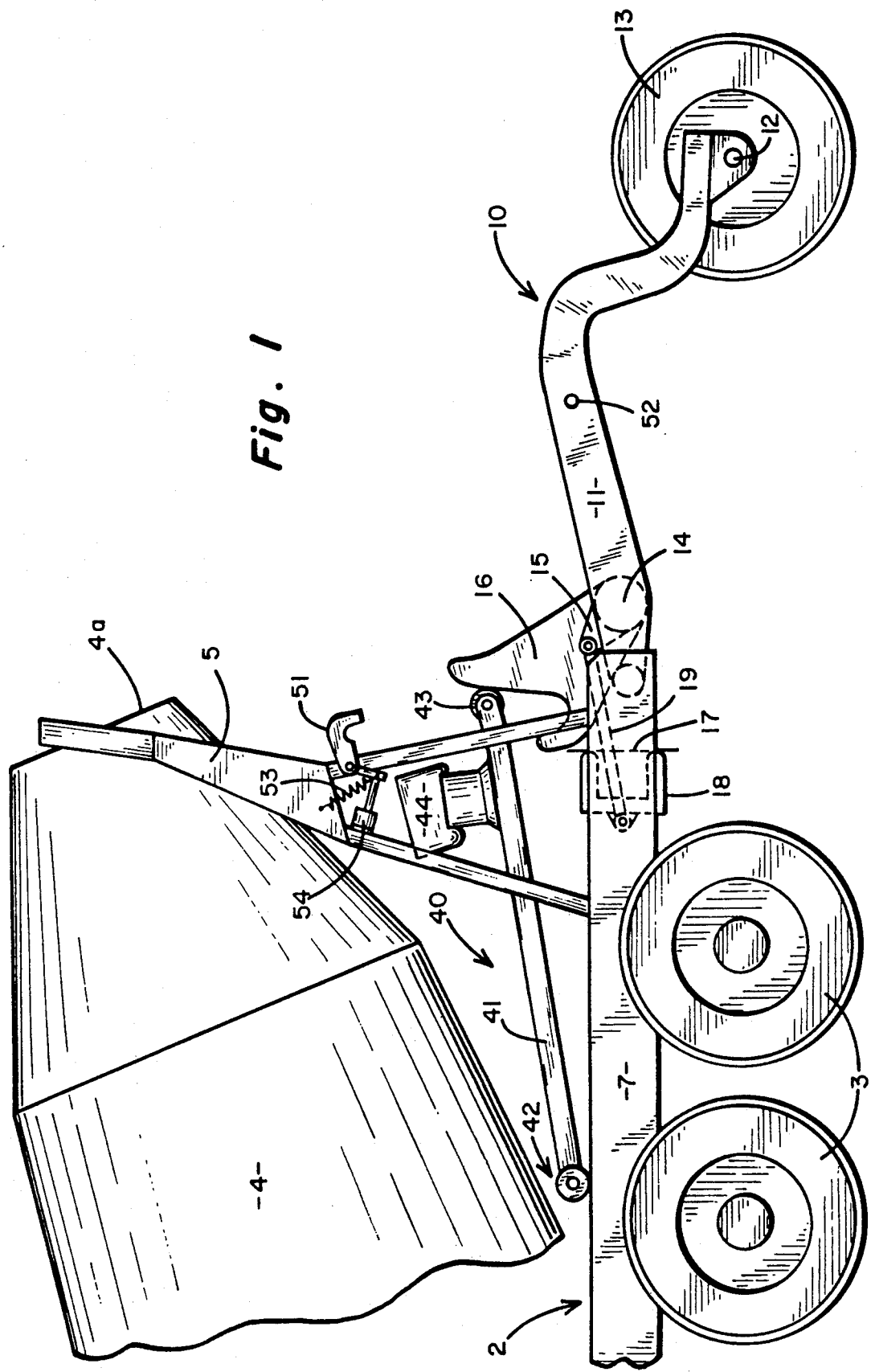
FIG. 1 is a side view of the present invention showing the tag axle assembly in its ground engaging position on flat terrain.

FIG. 1 shows a work vehicle of the type typically used to transfer concrete to a job site. The vehicle includes a frame 2, steerable front wheels (not shown), drive wheels 3, a mixing drum 4 supported on the frame by a mixing drum mount 5, directing shoots (not shown), and a tag axle assembly 10. As disclosed in U.S. Pat. No. 4,812,044, the shoots 6 can be mounted in such a way that they engage a limit switch which precludes actuation of the tag axle assembly 10 unless the shoots 6 are properly aligned and would not be damaged by the raising and lowering of the tag axle assembly 10.

The tag axle assembly includes a pair of arms 11 pivotally mounted at one of their ends to the frame 2 of the vehicle. Mounted to the opposite end of each arm 11 is a tag axle 12. Associated with each tag axle 12 is a tag wheel 13. Running between the two arms 11 of the tag axle assembly 10 at a point intermediate of the ends of the arms is a torque tube cross member 14. Secured to the torque tube cross member 14 are a pair of pivot members 15 and a cam plate 16.

Figure 2:
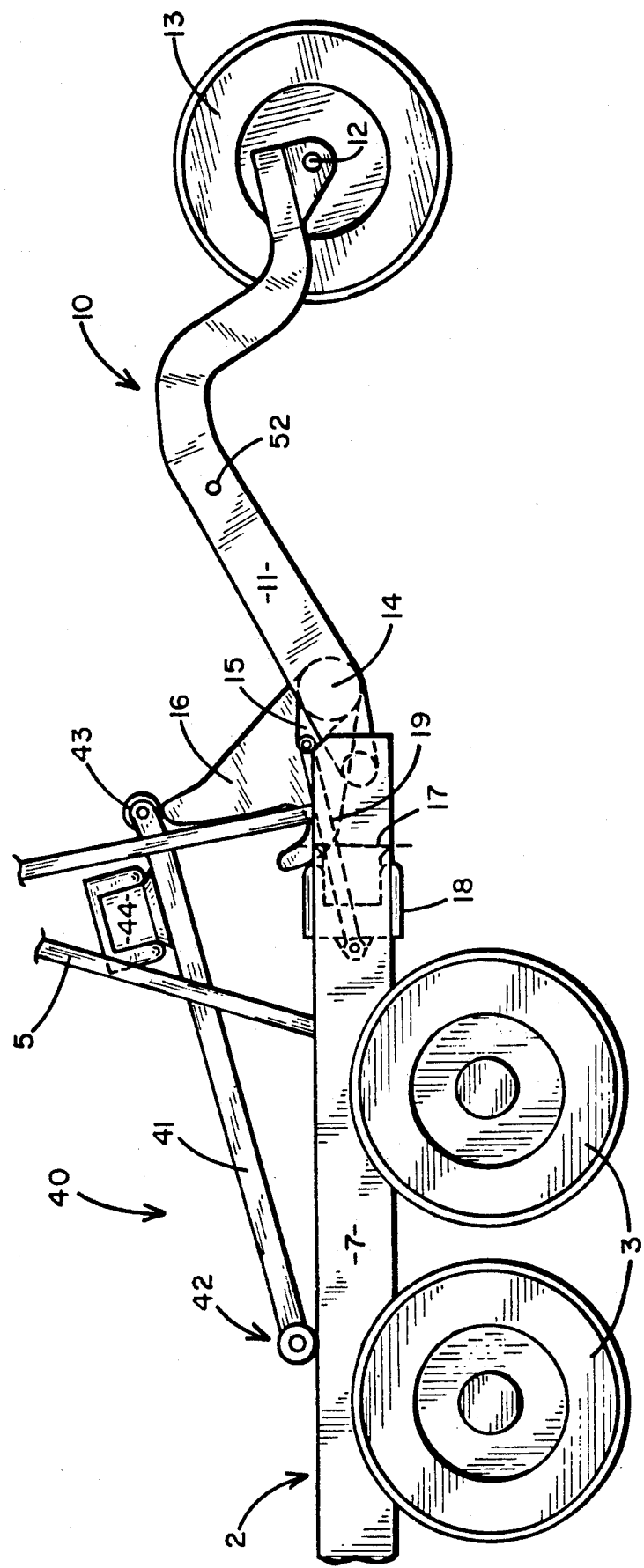
FIG. 2 is a side view like FIG. 1, but with the tag axle traveling over a raised grade.

The means used to raise and lower the tag axle assembly will now be described. The vehicle's frame 2 has a pair of rail members 7. Mounted to each rail member 7 of the frame 2 is a mounting plate 17 for an air actuator 18. Each air actuator 18 includes a stiff elongated arm 19 which is attached to the corresponding pivot member 15 located on the torque tube cross member 14 of the tag axle assembly. When the air actuators 18 are inflated, the arms 19 will pull on the pivot members 15 to cause the tag wheels 13 to be elevated to a first elevated position shown in FIG. 4. When the air actuators 18 are depressurized, the tag axle assembly is lowered to a second, ground engaging position (shown in FIGS. 1-3) in which the tag wheels engage the ground.

Figure 3:
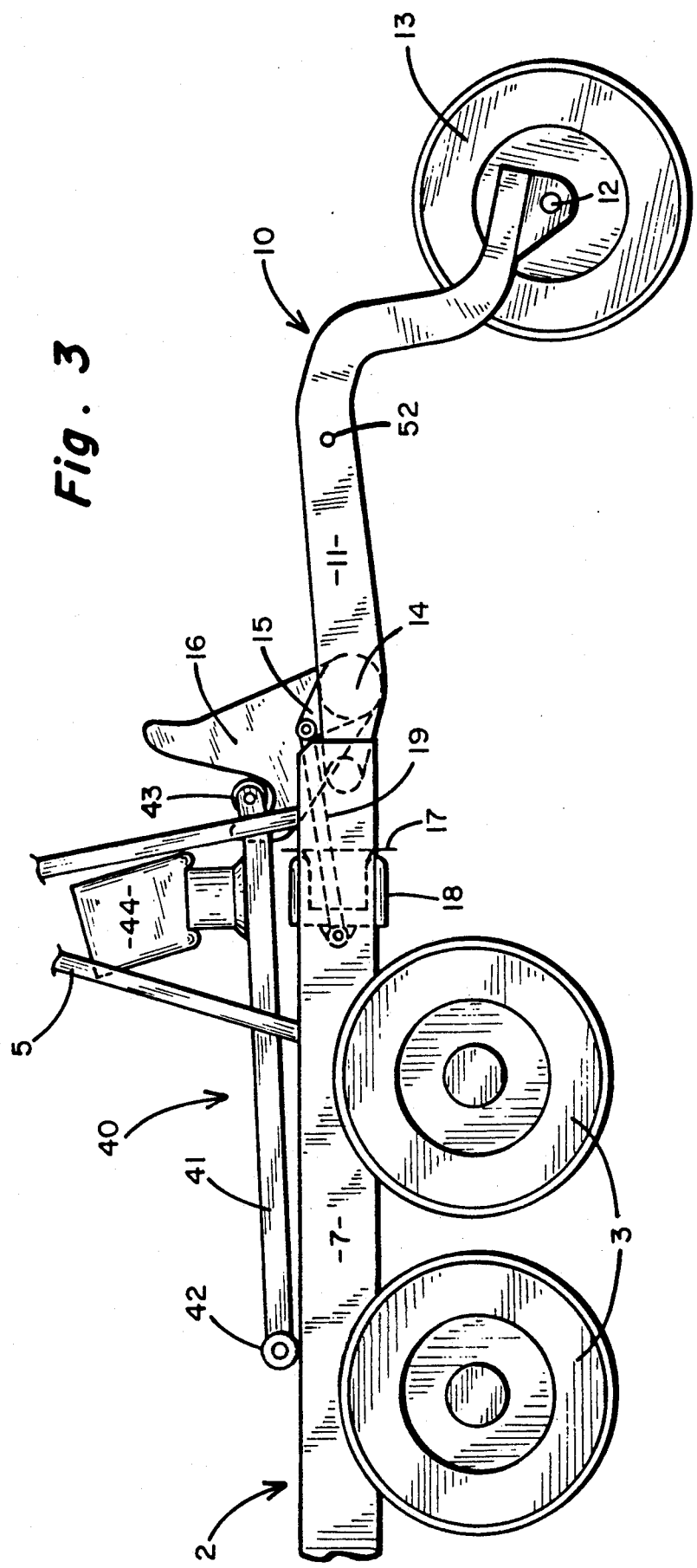
FIG. 3 is a side view like FIGS. 1 and 2, but with the tag axle traveling over a lower grade.

The principal advantage of the present invention is derived from the presence of a cam link assembly 40 for providing a variable downward force on the wheels 13 of the tag axle assembly 10 when the wheels 13 are in the ground engaging position and pass from level ground (as in FIG. 1) to either a higher grade (as in FIG. 2) or lower grade (as in FIG. 3). In the primary embodiment shown in FIGS. 1 through 10, the cam link assembly 40 includes a pair of cam link arms 41. Cam link arms 41 are secured at one end to a cross member 8 the vehicle's frame 2 by a cam link pivot 42. The opposite free ends of the cam link arms 41 retain a roller 43. The roller 43 is intended to ride over the camming surfaces of the cam plate 16 of the tag axle assembly 10.

The cam link assembly 40 also includes a pair of air springs 44. These air springs 44 are fixed to the support frame 5 of the mixing drum using suitable means and to the cam link arms 41. When the air springs 44 are inflated, a downward force is applied to the cam link arm. This force is transferred through the cam link arms 44 to the arm roller 43 and then through the cam plate 16 of the axle assembly 2 and the tag wheels 13.

The camming surfaces of the cam plate 16 can be divided into sections A first section of the cam plate 16 can be referred to as a roller rest 16a. Very little force is applied to this region of the cam plate 16. A second region of the cam plate 16 is the axle force unloading region 16d. This region is typically engaged by the cam roller 43 only when the tag axle assembly 10 is being moved between its elevated stowed position or its ground engaging position or when the wheels have engaged an extremely raised grade. This region of the cam plate 16 is specifically designed so that the tag wheels 13 can encounter any raised grade and will not bottom out the air actuators 44. Instead, downward force in the tag wheels 13 is essentially eliminated to allow the raised grade to pass under the tag wheels 13 so the vehicle will not be hung up by large bumps.

A third region of the cam plate 16 can be referred to as the axle lowering linear force region 16b. The roller typically engages this region. When the tag wheels 13 are travelling across relatively flat terrain or when smaller bumps are encountered. The cam roller 43 will roll up region 16b as the tag wheels 13 travel up one side of the bump and the cam roller 43 will travel down region 16b as the tag wheels 13 travel down the other side of the bump. Region 16b of the cam plate 16 is shaped so that the leverage factor of the air pressures on the air springs 44 is directly proportional to the force on the tag wheels 13 of the tag axle assembly 10. The angle of region 16b of the cam plate 16 allows a force multiplication onto the cam surface which cause high torque into the tag axle arms 11 and therefore a large force into the tag wheels 13 even though the arms 11 are relatively long. The shape of region 16b of the cam plate 16 is such that the linearity of the leverage factor is constant even if the tag axle wheels 13 are raised or lowered within a range corresponding to this region of the cam plate 16.

A fourth region of the cam plate is referred to as the axle lowering stop region 16c. The cam roller 43 travels through region 16c as dips are encountered in the terrain. When the dips are significant, a braking action is applied to the downward movement of the tag wheels 13. In the event a very deep trough is encountered, the cam roller 43 will automatically engage the axle lowering stop region 16c preventing further downward movement of the tag wheels 13 so they will essentially be held in the air.

Figure 5:
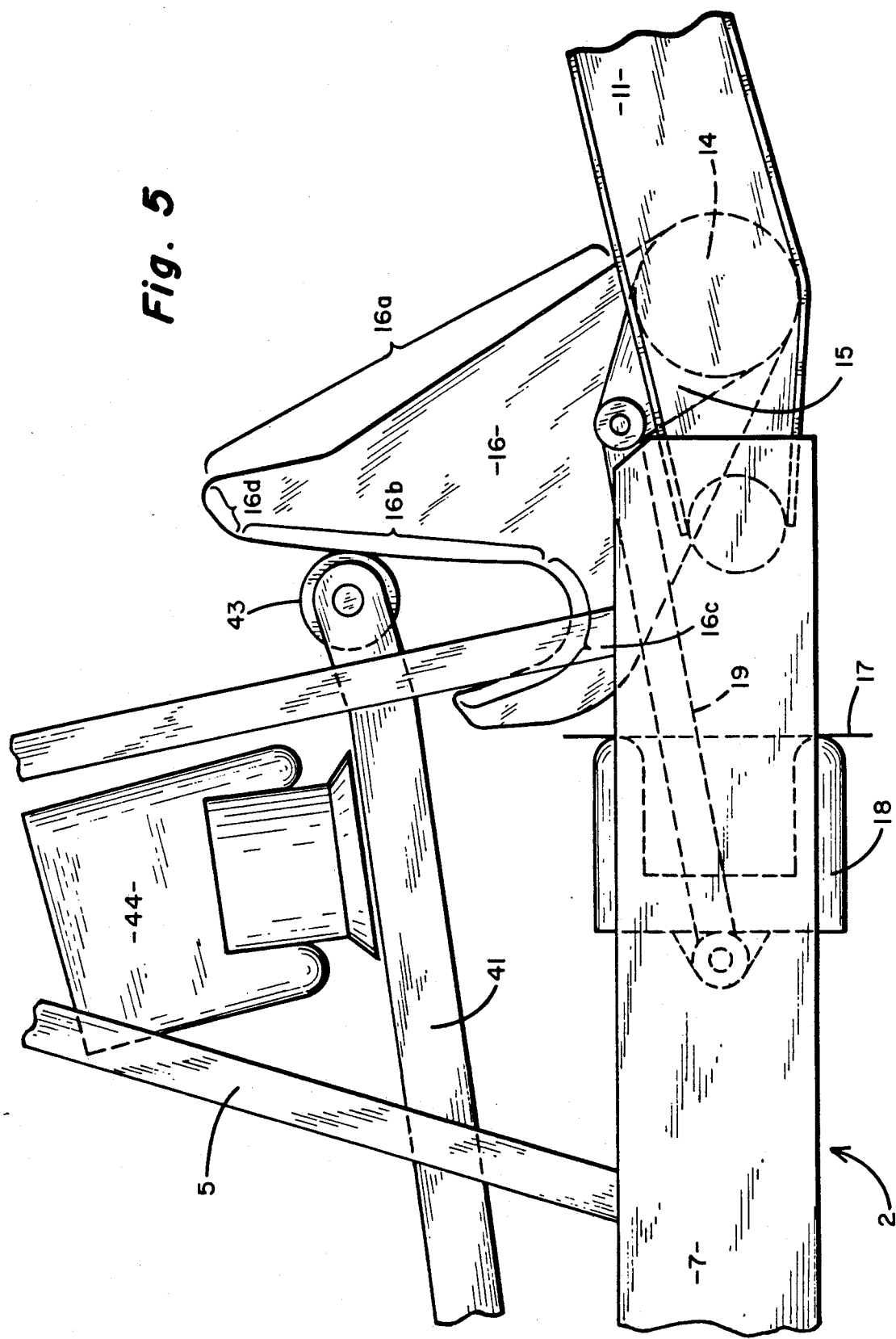
FIG. 5 is a side view showing the means for raising and lowering the tag axle assembly and the means used to apply a variable downward force on the tag axle assembly.
Figure 6:
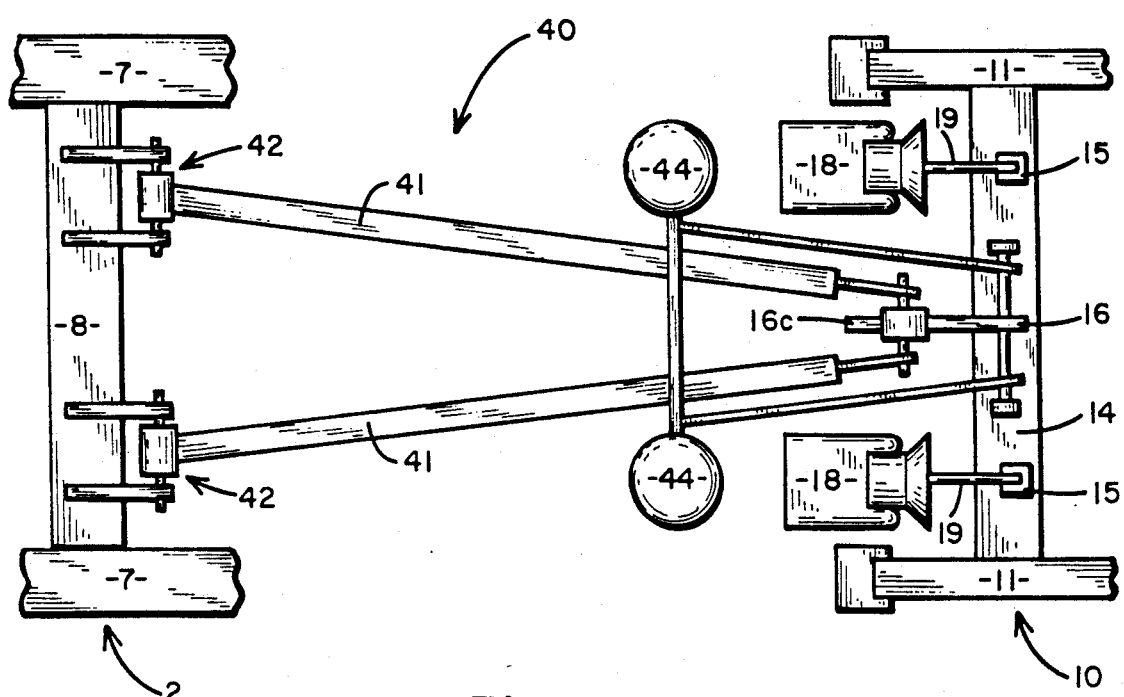
FIG. 6 is a top view of the structure shown in FIG. 5.

In summary and most clearly depicted by FIG. 5 a variable load can be placed upon the cam roller 43. The cam roller 43 is shown as being rotatably attached to a cam link arms 41. These cam link arms 41 are pivotally fixed to a cross member 8 of the vehicle's frame 2 so that the cam roller 43 can move up and down with respect to the cam plate 16. Associated with the cam link arms 41 are a pair of air springs 44. Air springs 44 are fixed to the support frame 5 for the mixing drum 4 using suitable means. When the air springs 44 are inflated, a downward force will be applied to a cam link arms 41. This force will be transferred through the cam roller 43 to cam plate 16 and ultimately to the tag wheels 13 of the tag axle assembly 10.

Figure 4:
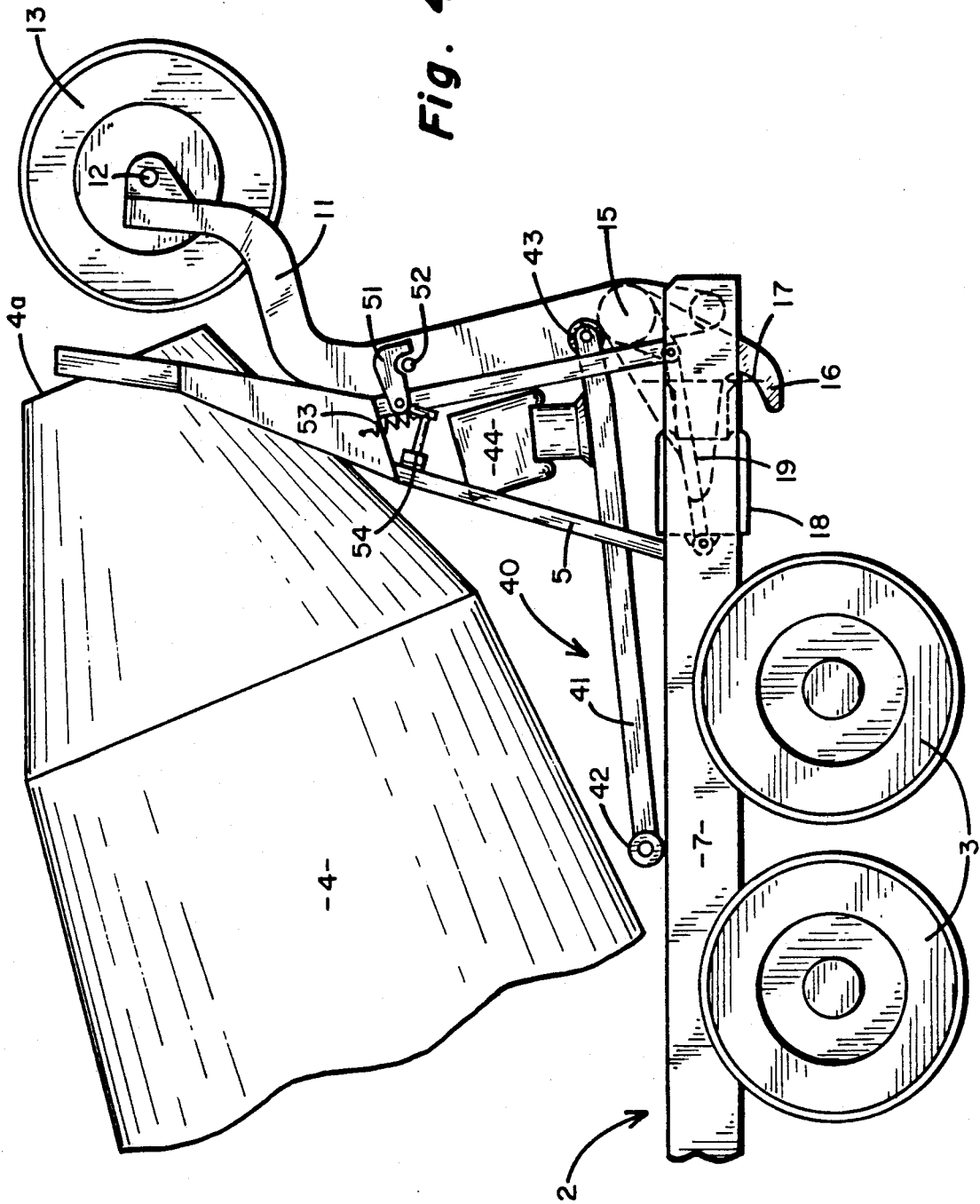
FIG. 4 is a side view showing the tag axle assembly in its raised position.

To ensure that the tag axle assembly 10 will remain in its elevated, stowed position as shown in FIG. 4) until it is desired that it be lowered to the ground engaging position, a latch assembly 50 has been added. The latch assembly 50 includes a hook 51 pivotally mounted at one end to the mixing drum mount 5 so that it can grab a pin 52 which has been attached to the arm 11 of the tag axle assembly 10 at an appropriate location. The latch assembly 50 also includes a biasing spring 53 designed to hold the hook 51 around the pin 52. Finally, the latch assembly 50 includes a pneumatic hook 54 actuator When inflated, the hook actuator 54 will overcome the force of the spring 53 and pivot the hook 51 until the pin 52 is released when the hook actuator 54 is not inflated, the spring 53 applies sufficient force to keep the hook 51 around the pin 52 thus locking the tag axle assembly 10 in place.

A complete understanding of the present invention requires a more detailed description of the pneumatic system of the present invention. This system controls the actuators 18 which raise and lower the tag axle assembly 10, the air springs 44 which apply a variable force to the cam link arms 41 as well as the pneumatic actuator 54 of the latch assembly. The pneumatic system of the present invention permits each of these actuators to be controlled remotely from the cab of the vehicle.

Figure 7:
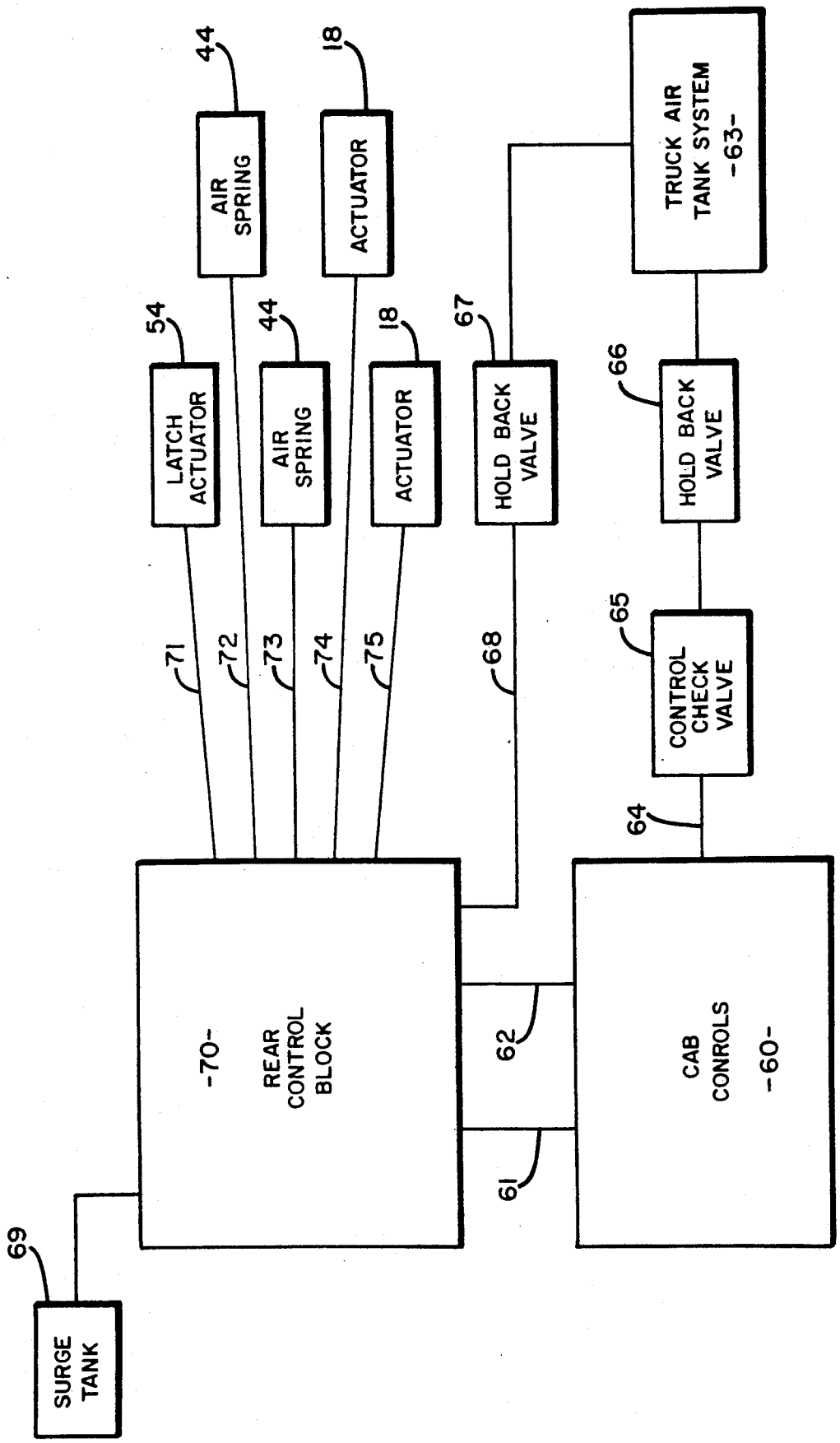
FIG. 7 is a block diagram of the pneumatic control system for the tag axle assembly of the present invention.
Figure 8:
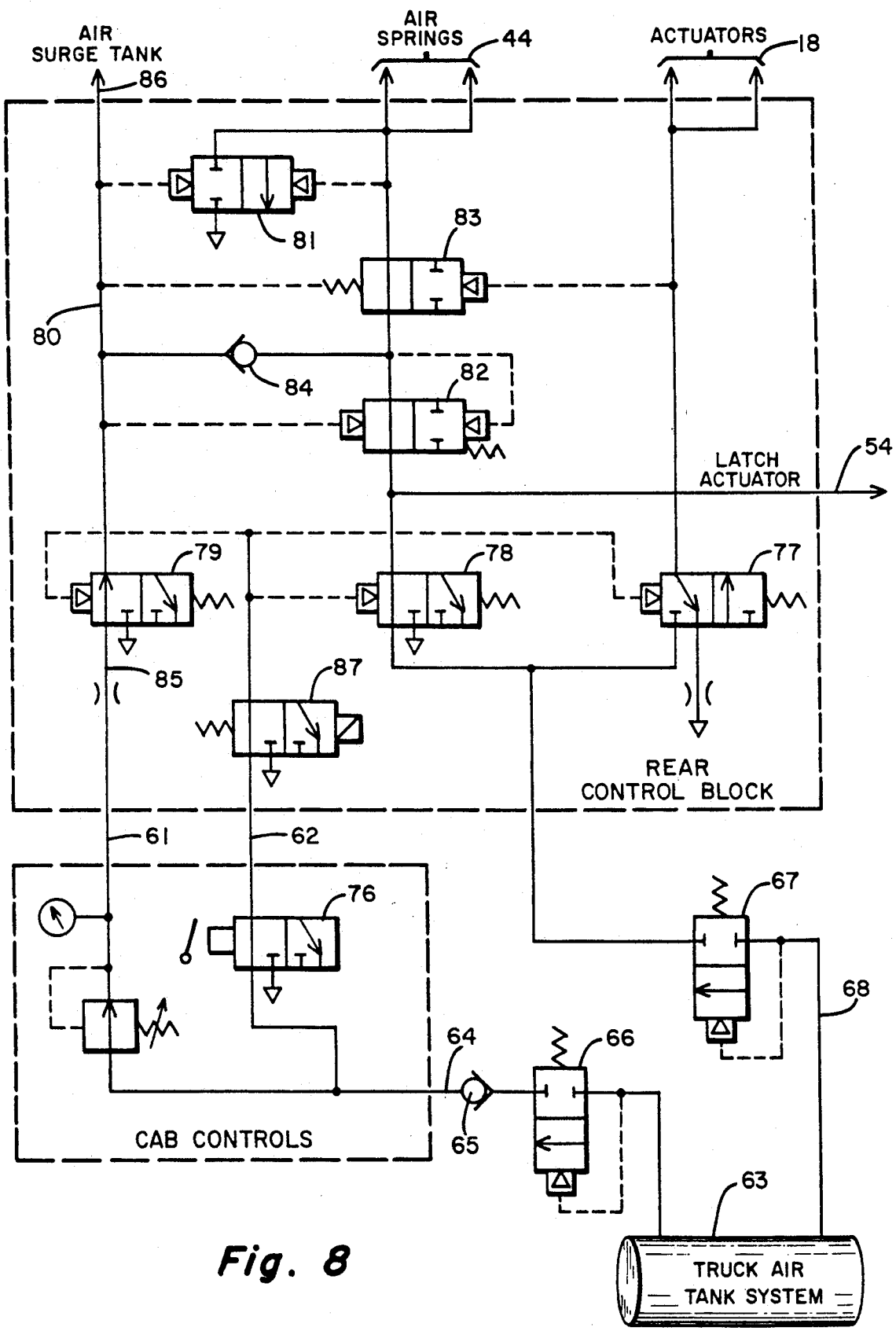
FIG. 8 is a schematic diagram of the pneumatic control system for the tag axle assembly of the present invention.

As shown in FIGS. 7 and 8, the pneumatic control system of the present invention includes cab controls 60 which are tied to a rear control block 70 by a pressure pilot line 61 and a direction pilot line 62. The cab controls 60 are also tied to the vehicles standard air system 63 by a line 64 which includes a control check valve 65 and a hold back valve 66. The vehicle's standard air system is also tied to the rear control block by a supply line which includes another hold back valve 67. The hold back valves ensure that a minimum of 60 psi is retained in the vehicle's air system 63 for the air brakes.

The hold back valve 66 in line between the vehicle's air system and the cab controls is set for a pressure about 10 psi less than the holdback valve 67 in the line 68 between the vehicle's air system 63 and the rear control block 70. This arrangement makes it possible to maintain control while air is being supplied to the rear control block 70 and air in the vehicle's standard air system 63 is drawn down to near its minimum pressure valve. The control check valve 65 is present to prevent a pressure drop in the pressure pilot line when the pressure drops in the vehicle's air system 63 as the vehicle's air brakes are applied. The pneumatic control system of the present invention also includes a surge tank 69 and separate lines (71-75) to each of the actuators 18 used to raise and lower the tag axle assembly, the air springs 44 used to apply forces to the cam link arm, and the actuator 54 of the latch assembly.

Operation of the pneumatic system of the present invention will now be described. When the operator desires to raise the tag axle assembly 10, a three-away up/down control valve 76 is moved to the up position. This causes the direction pilot line 62 to be depressurized so that the three relay valves 77, 78 and 79 in the rear control block are deactivated. Deactivation of the three relay valves 77-79 causes the regulated pressure control relay 79 to depressurize the pilot 80 of the down exhaust valve 81 which in turn depressurizes the air springs 44 of the cam link assembly 40. At the same time, the down relay 78 is shifted to the vented position which prevents air from repressurizing the air springs 44. Simultaneously, the up relay 77 is shifted to the pressurized position which allows air pressure to be applied to the actuators 18 which raise the tag axle assembly 10. As actuators 18 are pressurized, they expand and cause the tag axle assembly 10 to be raised to its upper position where it is latched and then held in position by the latch assembly 50. The tag axle will be maintained in this raised position by the latch assembly 50 even if the truck air system 63 loses its air pressure.

To lower the tag axle assembly 10, the three-away up/down control valve 76 is moved to the down position which pressurizes the direction pilot line 62 and activates the three relay valves 77-79. This causes the regulated pressure control relay to pressurize the pilot of the down exhaust valve 81 causing it to close. Also, the down relay 78 is activated which allows supply line air to be directed to the actuator 54 of the latch assembly 50. When sufficient pressure is in actuator 54, the force applied by the spring 53 is overcome so that the hook 51 is rotated releasing the pin 52. Simultaneously, air is directed to the down delivery valve 82 which regulates the pressure down to 15 psi lower than the pressure in the pressure pilot line 61. The up relay 77 is shifted to the vented position which allows the air in the actuators 18 to escape through an orifice which allows the tag axle assembly 10 to be lowered at a controllable rate. When the tag axle assembly 10 has been lowered until it is in contact with the ground and the pressure in the actuators 18 have dropped to less than 25 psi, the down sequence valve 83 will shift to the open position allowing air to fill the air springs 44 of the cam link assembly 40. This sequence is necessary to allow the cam roller 43 to get past the tip 16d of the cam 16 and onto the linear forced area 16b of the cam 16 before air springs 44 exert force on the cam roller 43.

The air springs 44 are supplied with air from the down relay 78 which can supply a large volume of air up to 15 psi less than the pressure pilot line pressure 61. The air springs 44 are also supplied through the regulated pressure control relay 79, an orifice 85 and a pilot check valve 84 which will supply the air springs 44 up to the full pressure of the pressure pilot line 61 but with a small flow rate. This arrangement allows the air springs 44 to pressurize quickly to a pressure about 15 psi less than the pressure pilot line pressure. Then the air springs 44 slowly pressurize to the pilot line pressure through pilot check valve 84.

As the tag axle assembly encounters uneven terrain, the pressure in the air springs 44 will vary accordingly within a range of about 10 psi. Down delivery valve 82 limits the pressure supply to air springs 44 preventing large amounts of air from being introduced to the air springs 44 during the pumping action. Any over supply of air in the air springs 44 is vented out of the down exhaust valve 81 to prevent over pressurizing the air springs 44. Thus, a nearly constant average pressure in the air springs 44 is obtained with a minimum of air used. The small air surge tank 86 is also connected to the pilot line 80 to smooth out pressure variations in the pilot line 80 resulting in more constant operation of the down exhaust valve and down delivery valve 82.

It is well known that if a vehicle with a tag axle assembly is driven in reverse while the tag axle assembly is lowered, the tag axle assembly can be damaged because the wheels will not self-steer. To prevent this, a reverse gear solenoid valve 87, activated by the vehicle's backup light electrical circuit, can be added to the pneumatic system. When the reverse gear solenoid valve 87 is actuated, the three relay valves 77-79 will be deactivated the same as when the three-way up/down control valve 76 is placed in the up position. As a result, the tag axle assembly 10 will automatically be raised to its stowed position when the vehicle, when so equipped, is placed in reverse.

In summary, then, the pneumatic system of the present invention provides a combination of valves that can deliver a controlled pressure to, and limit the peek pressure in, the air springs in a controlled sequence that does not fill the air springs until the tag axle is in its lowered position. Also, the system provides a combination of valves that can release a safety latch mechanism only when the tag axle is to be lowered. The system also provides a combination of valves that will depressurize the air springs and pressurize the actuators used to raise and lower the tag axle and allow the latch mechanism to lock the tag axle in its raised position when either the three-away up/down control valve is set to the up position or a reverse gear solenoid valve is activated by application of the vehicle's backup lights.

FIGS. 9 through 18 represent alternative embodiment of the present invention. All of the embodiments disclosed include means for apply a variable downward force upon the wheels of a tag axle assembly 10.

Figure 9:
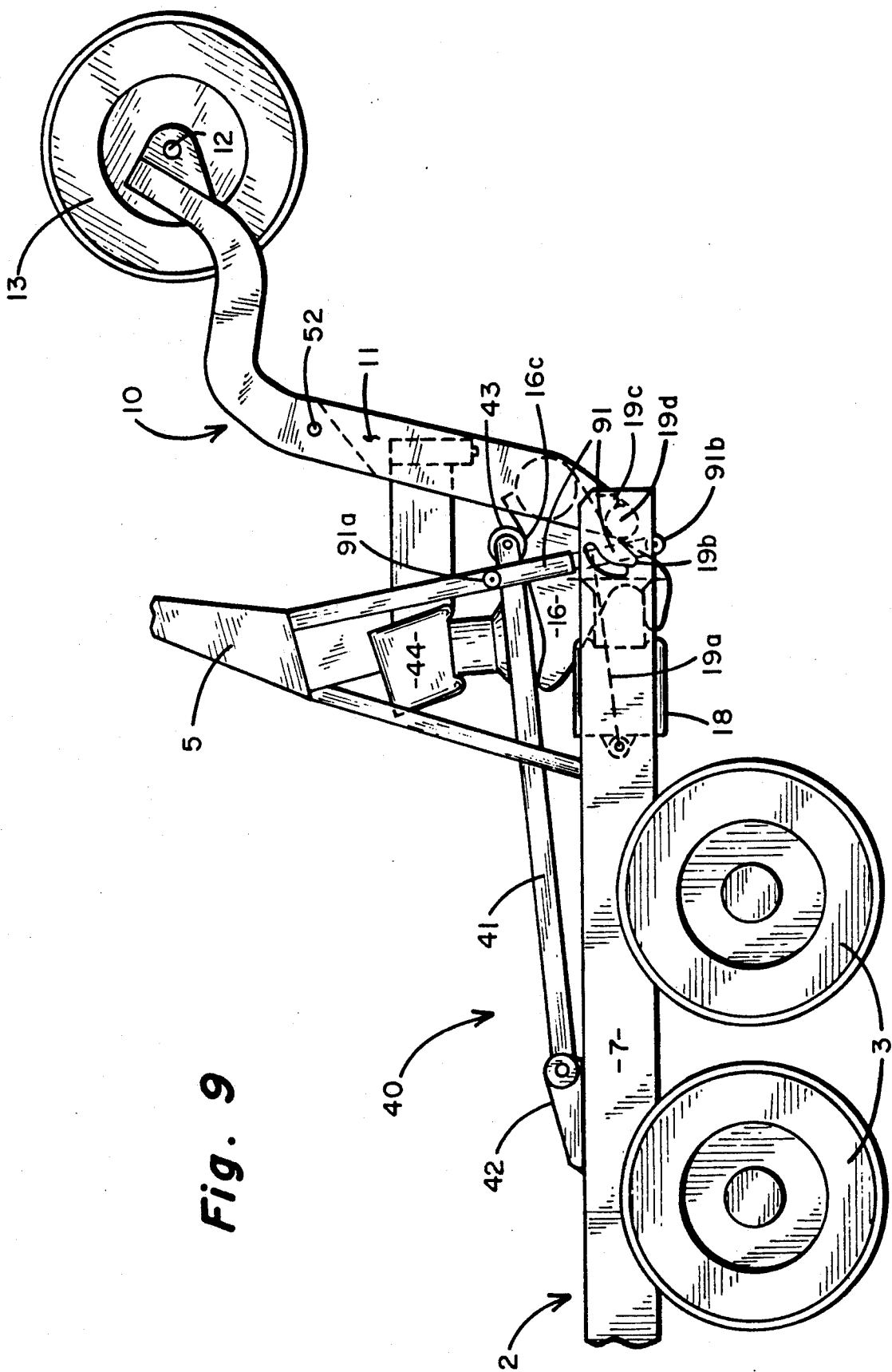
FIG. 9 is a side view like FIG. 5, but showing an alternative embodiment which enables the tag axle assembly to be stopped and held at an intermediate position between its raised position and its ground engaging position.
Figure 10:
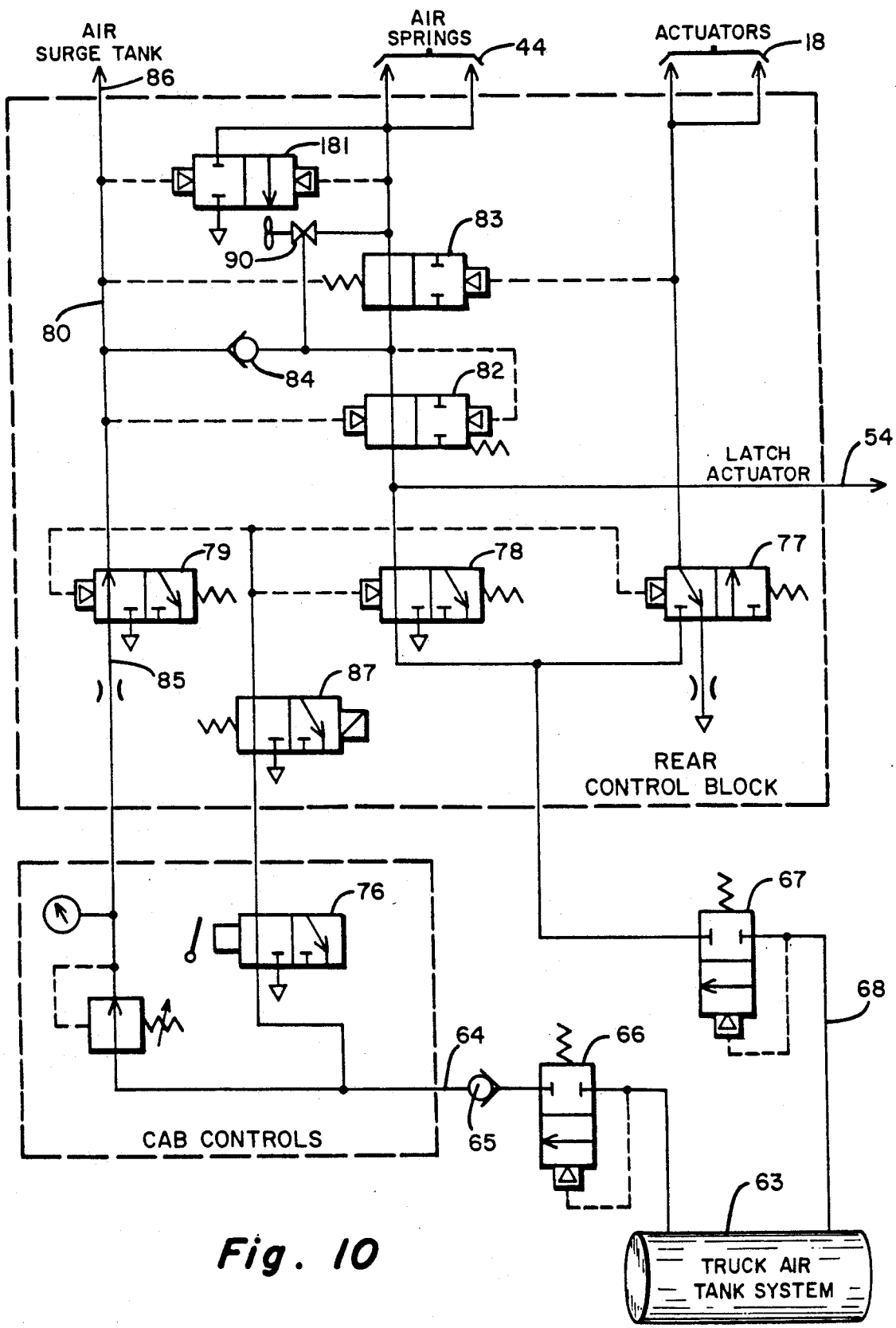
FIG. 10 is a schematic diagram of the pneumatic control system used to operate the alternative embodiment of FIG. 9.
Figure 11:
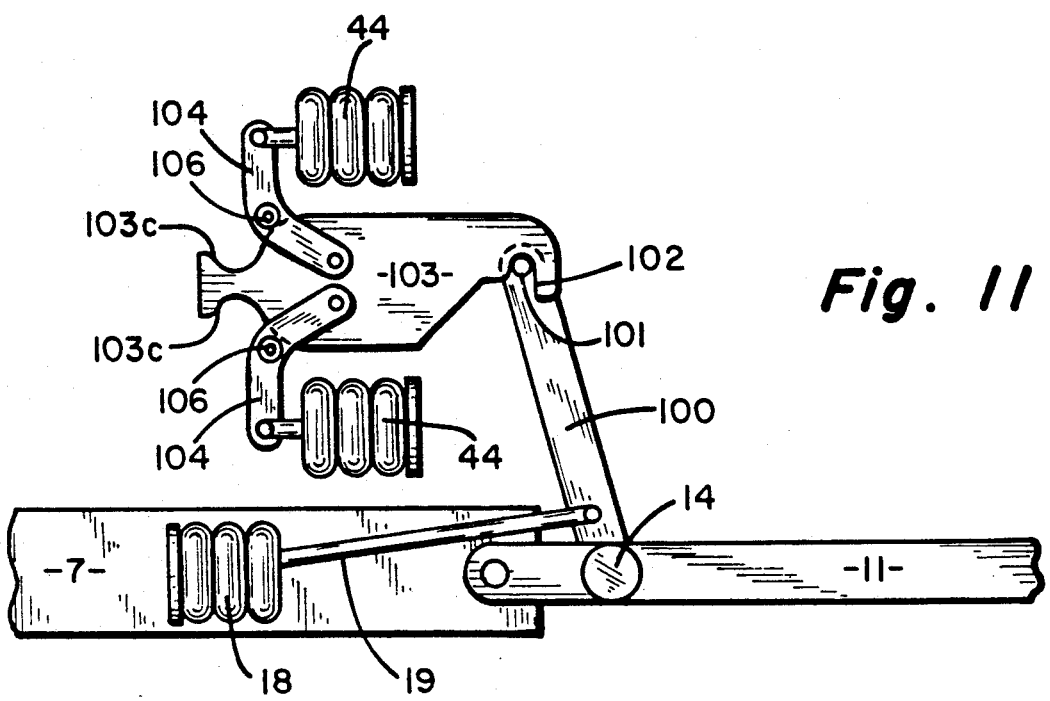
FIG. 11 is a schematic diagram showing a second alternative embodiment with the tag axle assembly in its ground engaging position.
Figure 12:
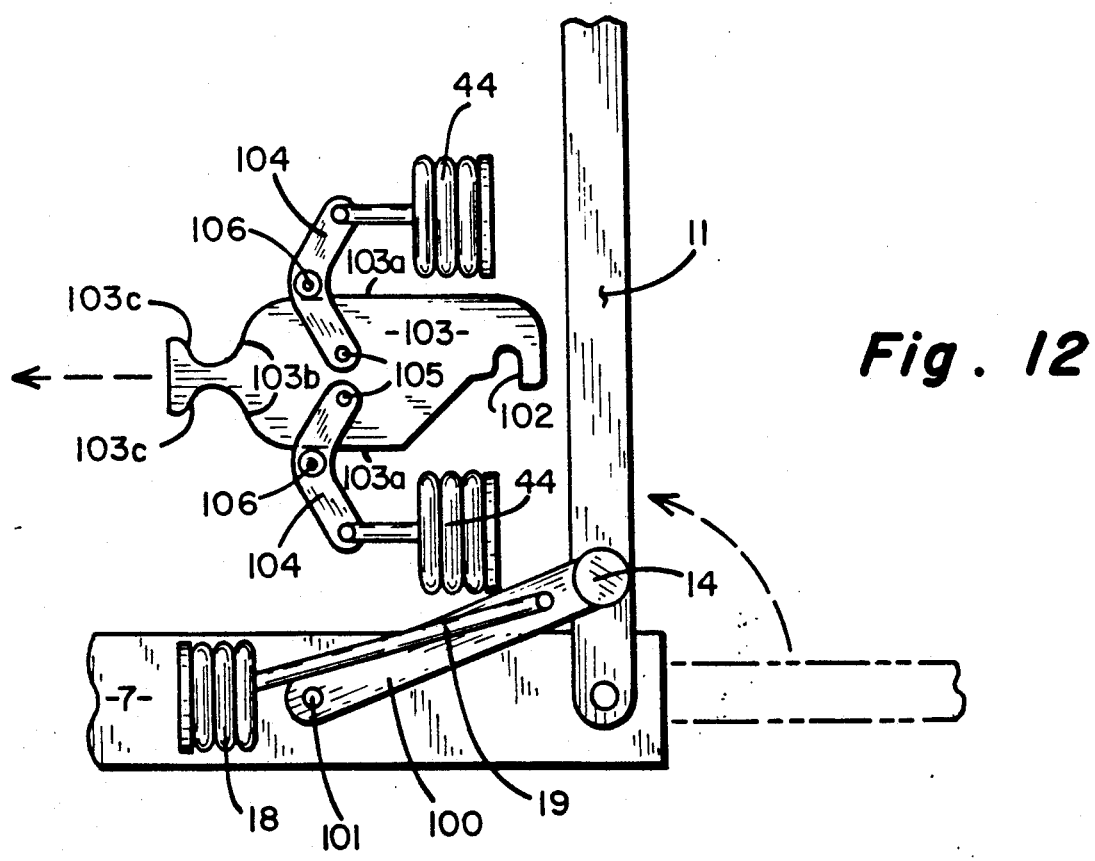
FIG. 12 is a schematic diagram of the embodiment of FIG. 11 with the tag axle assembly in its elevated position.
Figure 13:
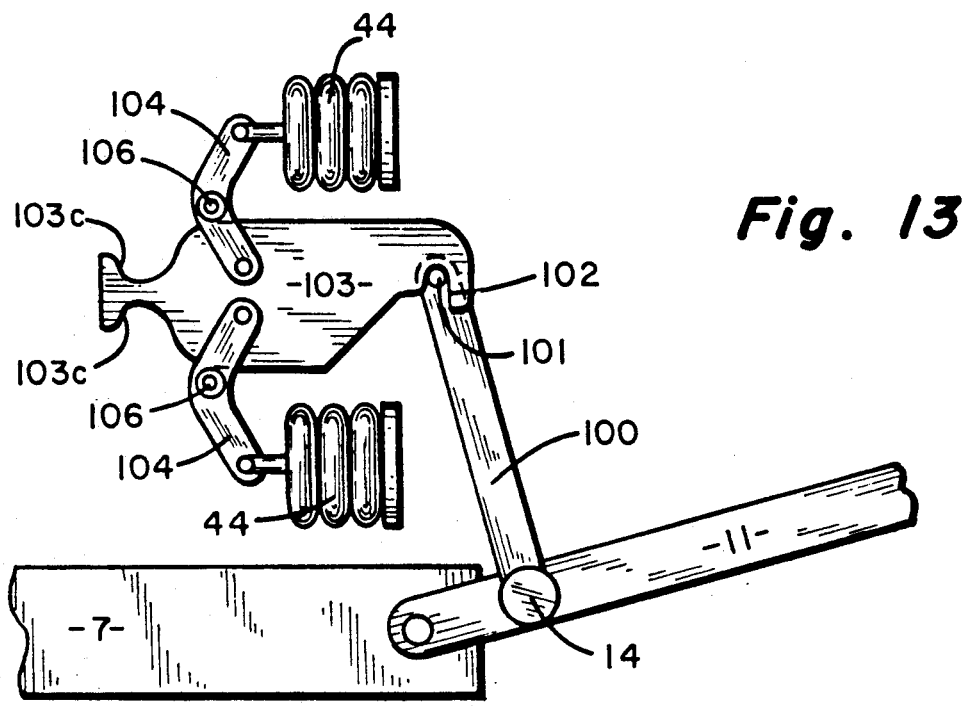
FIG. 13 is a schematic diagram as in FIG. 11, but when a raised grade is encountered by the tag axle assembly.
Figure 14:
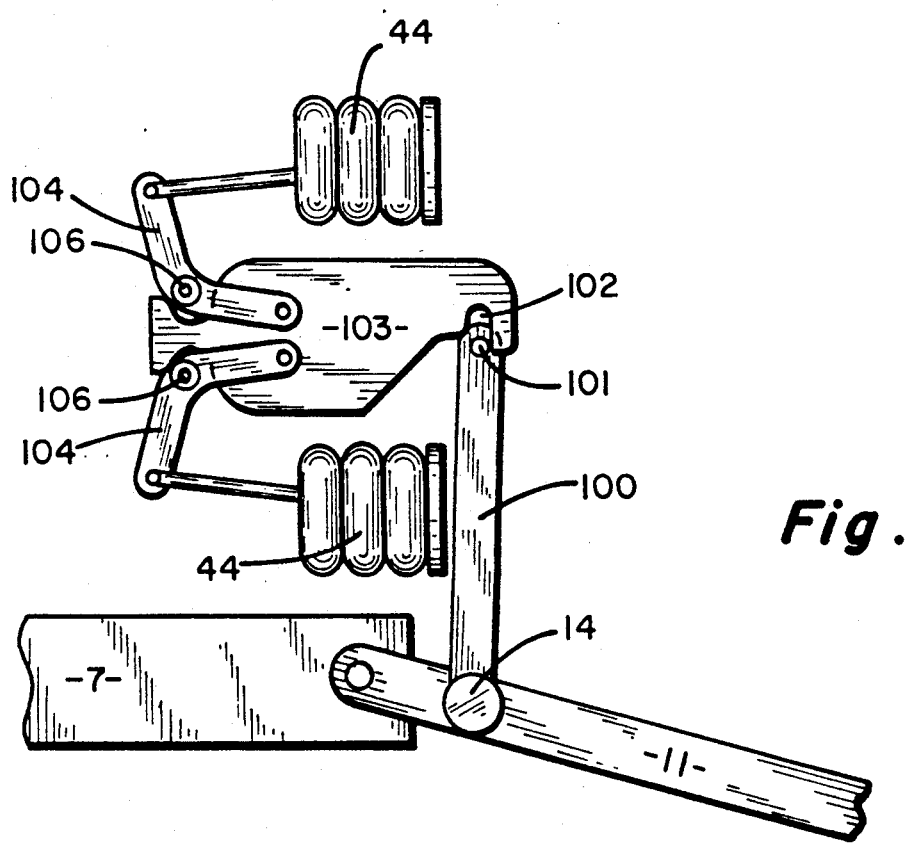
FIG. 14 is a schematic as in FIGS. 11 and 13, but when a depression is encountered by the tag axle assembly.
Figure 15:
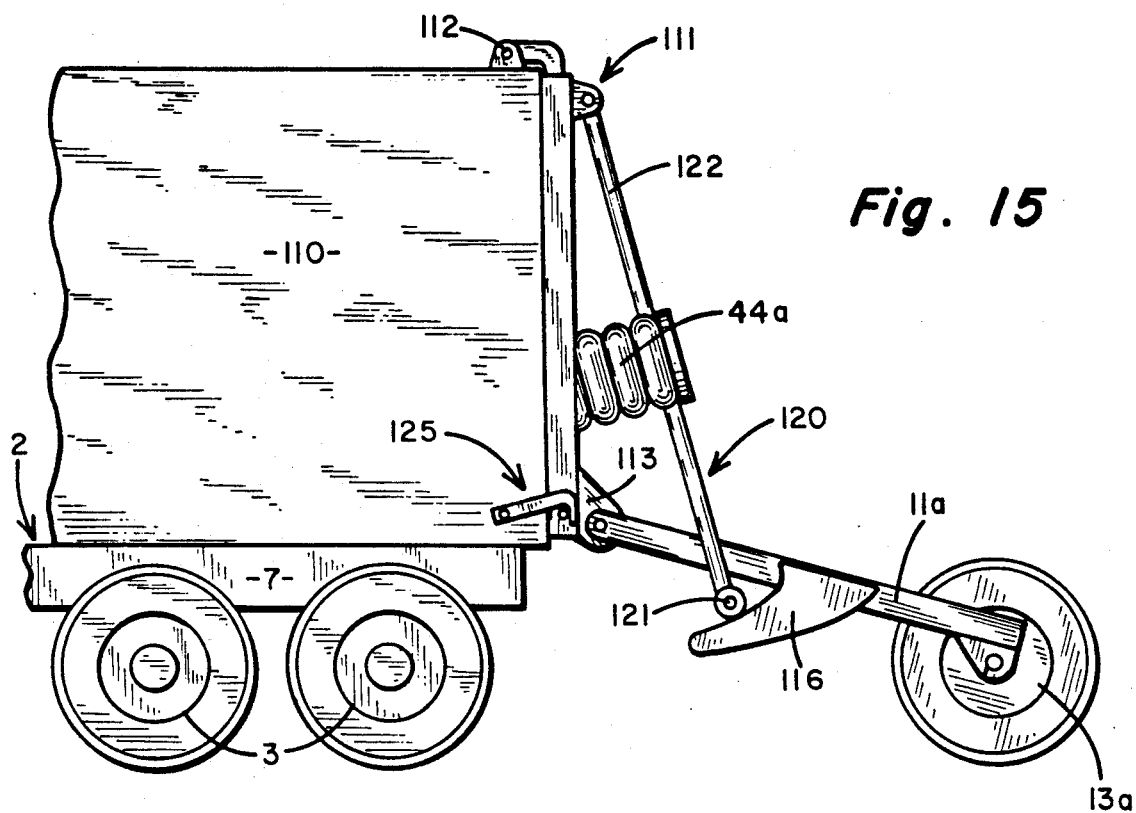
FIG. 15 is a schematic diagram showing how the present invention can be adapted to apply a variable downward force on a tag axle assembly mounted on a vehicle having a dump-type body.
Figure 16:
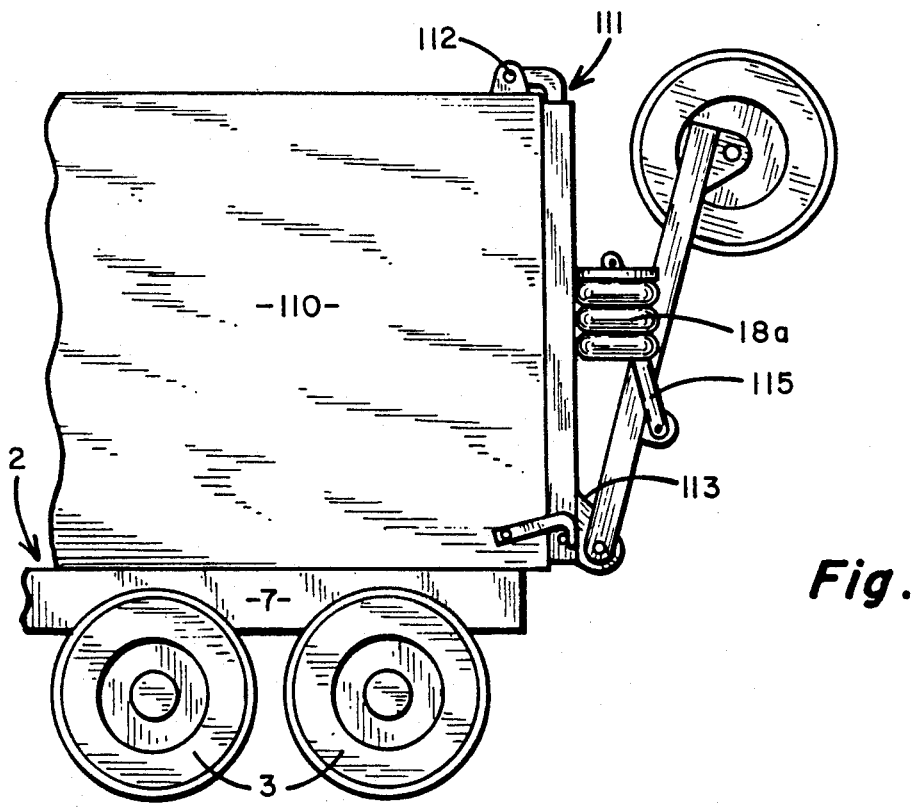
FIG. 16 is a schematic diagram showing the means used to raise and lower the tag axle assembly of FIG. 15.
Figure 17:
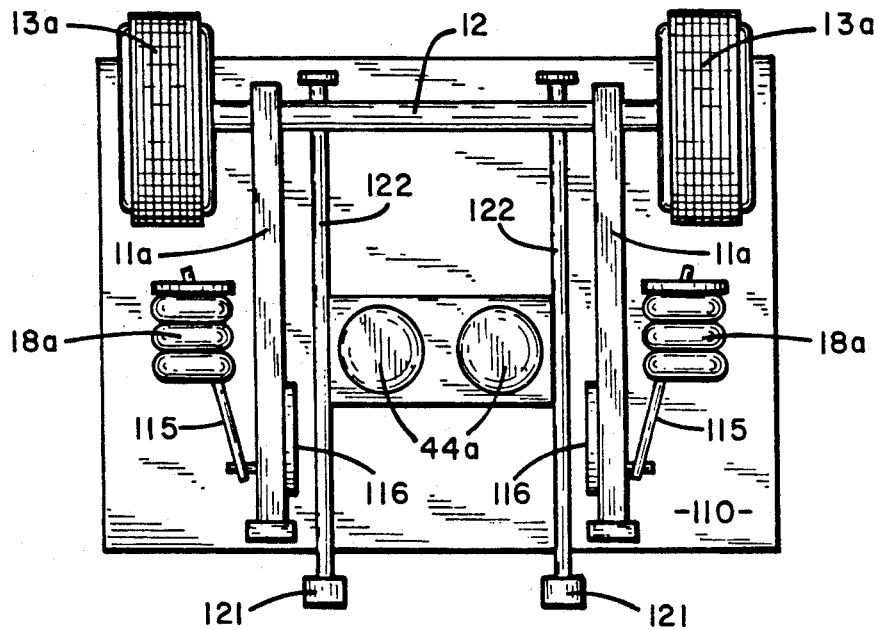
FIG. 17 is a rear view of the tailgate of the embodiment of FIGS. 15 and 16.

Most similar to the embodiment described in detail above is the embodiment represented by FIGS. 9 and 10. One difference is that in this embodiment, a cable 19a (rather than a rigid arm 19) runs between the air actuators 18 and the associated pivot members 15. Change in the amount of tension placed upon the cable by inflation or deflation of the air actuators 18 will cause the tag axle assembly to be raised or lowered. In addition, a curved cable cam 19b can be fastened to the cam plate in a location which permits the cable to be wrapped around the cable cam. This embodiment also includes anchors 19c for the lift cables 19a which are welded to the cam plate. The placement and shape of this cable cam is such that when the air actuator places tension on the cable, the tag axle assembly is rotated about pivot members 19d.

Other differences between this alternative embodiment and the primary embodiment discussed above makes it possible to allow the tag axle assembly 10 to be lowered to an intermediate position (shown in FIG. 9) and maintained in that position until the tag axle assembly 10 is required to be in the fully lowered, ground engaging position shown in FIG. 1, for example. This feature is particularly desirable when a mixer is being loaded at a concrete batching plant. Some batching plants use large dust hoods which must fit completely around the vehicle's charge hopper (not shown) and rear of the drum 4. If the tag axle assembly 10 is in its fully elevated position, (as in FIG. 4), it is in the way and makes it difficult (if not impossible) to properly position the dust hood.

To permit the tag axle assembly 10 to be lowered to and maintained in a position during loading of the vehicle, the cam plate 16 is modified to include a step 16e on its roller rest region 16a. Likewise, the pneumatic control system is modified to include an optional axle stop valve 90. When valve 90 is opened, the air springs 44 are inflated to place a downward force on the cam link roller 43 during the time that the tag axle assembly 10 is being lowered. When the tag axle assembly 10 is lowered to the point where the cam link roller 43 engages the step 16e on the cam plate 16, the tag axle assembly 10 is held in place and prevented from lowering further. Later, when it is desirable to lower the tag axle assembly 10 to the ground engaging position, the air springs 44 are momentarily vented so that the cam link roller 43 can jump up and over the step 16e. A pair of dampening devices 91 (such as hydraulic cylinders or shock absorbers) can be added so that the tag axle assembly 10 lowers in a controlled manner at a smooth, predictable rate. Each dampening device 91 has a top mount 91a and a bottom mount 91b.

As maintained above, in this alternative embodiment, the pneumatic control system includes an additional valve 90. When this valve 90 is open, the intermediate position stop mode of operation is selected. If this valve is closed, the air springs 44 are not pressurized during the lowering of the tag axle assembly 10 so the cam link roller 43 will not hang up on the cam plate's step 16e.

Operation of the tag axle assembly 10 in the intermediate position mode requires that the three-way up/down control valve 76 be placed in the down position. This causes air to be let out of the air actuators 18 and will allow air to bypass the down sequence valve 83 through the optional axle stop valve 90 to pressurize the air springs 44. When the tag axle assembly 10 reaches its intermediate position, the cam link roller 43 engages the cam plate step 16e and holds the tag axle assembly 10 in the intermediate position. When it is desirable to lower the tag axle assembly 10 from the intermediate position to the ground engaging position, the three-way up/-down control valve 76 is placed in the up position for a few seconds. This causes air to be vented from the air springs 44 and permits the cam link roller 43 to jump over the cam plate step 16e to permit further lowering of the tag axle assembly 10. When the tag axle assembly 10 is just above the ground engaging position, the three-way up/down control valve 76 is moved to the down position. This allows the remaining air in the air actuators 18 to be vented. At the same time, the air springs 44 are again pressurized causing a variable force to be applied to the tag axle assembly 10. The limited rates at which air can be vented from the air actuators 18 and introduces into the air springs 44 will cause both the air actuators 18 and air springs 44 to be partially pressurized in such a way and for a sufficient time that the tag axle assembly 10 will be lowered without the upper tip 16d of the cam plate 16 hanging up on the cam link roller 43. The step in the cam plate has no effect on raising the tag axle assembly 10 from the ground engaging position to the fully elevated position.

A third embodiment is shown best in FIGS. 11-14.

In this embodiment the tag axle assembly includes a lever arm 100 which is fixed at one end to the torque tube cross member 14. The lever arm 100 includes a pin 101 near its opposite end which is intended to mate with a hook 102 formed in a cam plate 103.

This embodiment also includes a pair of air springs 44. Each air spring 44 is mounted to the vehicle frame and pivotally secured to one end of an associated L-shaped cam arm 104. The opposite ends of the L-shaped cam arms are pivotally secured to the cam plate by pins 105. Rotatably secured to each L-shaped cam arm 104 near its apex is a cam roller 106. The cam rollers 106 are intended to engage the camming surfaces of the cam plate 103. When the air springs 44 are inflated, a force is applied to the tag wheels 13 of the tag axle assembly 10 through the lever arm 100 and the cam plate 103.

Again, the cam plate 103 is designed so various portions of the camming surfaces perform different functions. For example, the rollers only contact the forward sections 103a of the cam plate 103 as the tag axle assembly 10 is deployed up or down or when the tag wheels 13 engage an extremely raised grade. Very little force is applied to this section of cam plate 103. The axle lowering linear force regions 103b of the cam plate 103 are engaged by the rollers 106 when the air springs 44 are inflated. The camming surfaces also include an axle lowering stop region 103c. In the event a sharp drop is encountered so the rollers 106 engage this region, the mechanism will actually hold the tag axle assembly 10 in the air to prevent damage to the tag axle assembly 10 and vehicle.

Figure 18:
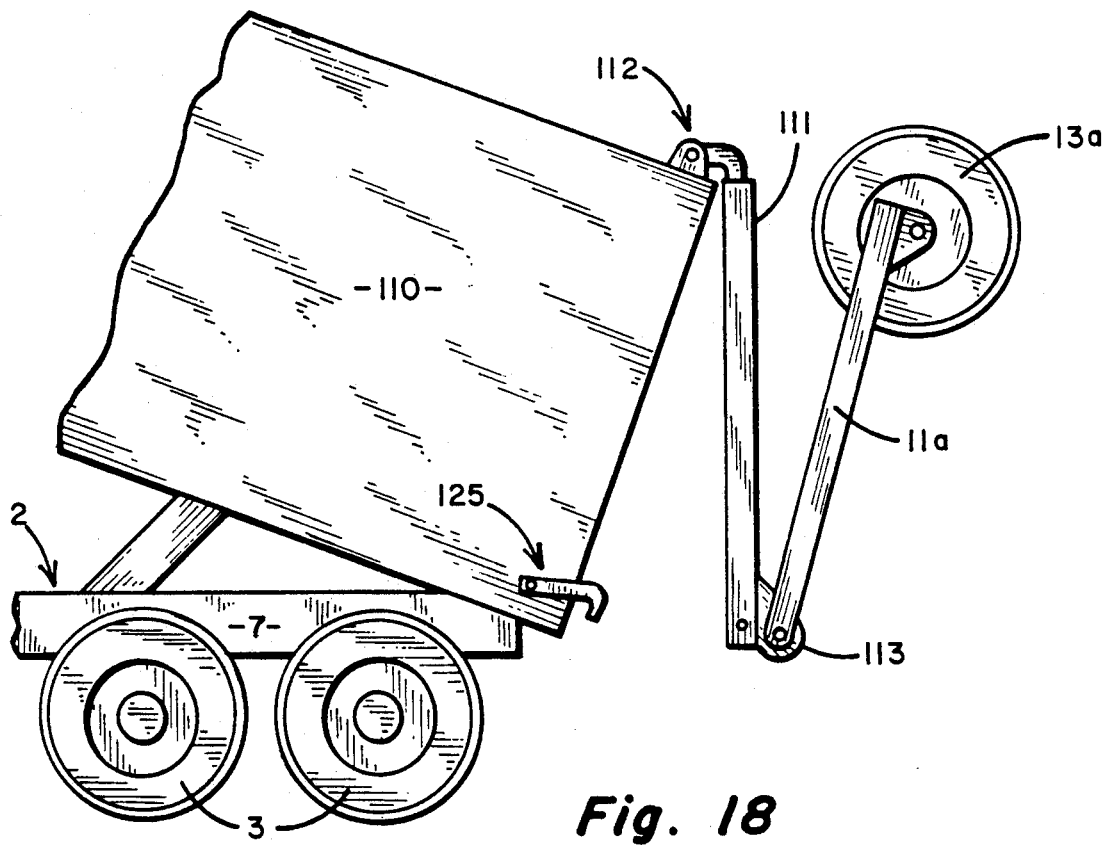
FIG. 18 is a side view showing how the tailgate of FIG. 17 can be mounted to a dump type body so that the tailgate swings away from the body when it is tilted for dumping.

As shown in FIGS. 15 through 18, the present invention can also be adapted for use in conjunction with a vehicle having a dumping or refuse type body 110. In this embodiment, a secondary tailgate 111 is pivotably secured to the body 110 of the vehicle by a hinge mechanism 112. The tag axle assembly is secured to the tailgate by pivot members 113. Similarly, the air actuators 18a used to raise and lower the tag axle assembly and the air springs 44a are all mounted to the tailgate. The tag axle is raised and lowered by pneumatic actuators 18a which are tied to the arms of the tag axle assembly by axle raising links 115. Secured to the inside of each arm of the tag axle assembly is a cam plate 116. This embodiment includes a cam link assembly 120 comprising a cam link roller 121 and a pair of cam link arms 122 which are pivotably secured at one end to the top of frame 111. Again, the roller 121 which is intended to ride along the camming surfaces of the associated cam plate 116. This cam link assembly also includes a pair of air springs 44a which are present to provide a variable force to the cam link arms 122. Such forces are, in turn, applied to the tag wheels 13a of the tag axle assembly through the arms 11a and cam plates 116 of that assembly and the rollers 121 on the cam link arms. Finally, this alternative embodiment includes a releasable latching mechanism 125 which holds the bottom of the tailgate to the vehicle. When latching mechanism 125 is released and the body 110 is tipped for dumping, the tailgate and tag axle assembly rotate out of the way (as shown in FIG. 18) so that the contents of the vehicle can be unloaded. Although the present invention has been illustrated and described in connection with several embodiments, it will be understood that this description is illustrative of the invention and is by no means restrictive thereof. It is reasonably to be assumed that those skilled in the art can make numerous revisions and adaptations of the invention and that it is intended that such revisions and adaptations of the invention will be included within the scope of the following claims as equivalence of the invention.

What is claimed is:

1. For a work vehicle having a main frame:
   (a) a tag axle assembly which includes a pair of arms pivotally mounted to the vehicle, at least one tag axle, at least one tag wheel and a cross member,
   (b) means for moving the tag axle assembly between a first position in which the tag wheels are elevated and a second position in which the tag wheels engage the ground, said means for moving the tag axle assembly including a pneumatic actuator fixed to the vehicle, a pivot member secured to the cross member of the tag axle assembly, and an elongated member secured at one end to the pneumatic actuator and at its other end to said pivot member for transferring force from the pneumatic actuator to the pivot member so that the pivot member, elongated member and pneumatic actuator cause the tag axle assembly to move to said first position when said pneumatic actuator is inflated with air; and
   (c) pneumatic means for applying a variable downward force on the tag wheels when the tag wheels engage the ground.

2. The apparatus of claim 1 wherein said elongated member is a stiff elongated arm.

3. The apparatus of claim 1 wherein said elongated member is a cable.

4. The apparatus of claim 1 wherein said means for applying a variable downward force comprises:
   (a) at least one link arm having one end pivotally fixed to and projecting rearwardly from said vehicle and a cam roller associated with the other end of said arm;
   (b) an air spring; and
   (c) a cam plate projecting from the cross member of the tag axle assembly and having at least one surface which engages the cam roller of the arm so that the arm, air spring and cam plate cooperate to cause said variable downward force to be applied to the tag wheels.

5. The apparatus of claim 4 in which said cam plate is shaped so that the cam plate, cam roller and air springs cooperate to prevent the tag wheels from dropping below a certain predetermined position relative to the main frame of the vehicle.

6. The apparatus of claim 1 wherein said means for applying a variable downward force comprises:
   a. a lever arm fixed at one end to said cross member and having a pin projecting from its other end;
   b. a cam plate having a hook for receiving said pin;
   c. a pair of air springs; and
   d. a cam arm associated with each air spring for joining said air spring to said cam plate so that the air springs, cam arms, cam plate and lever arm cooperate to apply the variable downward force upon said tag wheels when said air springs are inflated with air.

7. The apparatus of claim 1 further including means for stopping and retaining the tag axle assembly in an intermediate position between said first and said second position when the tag wheels are moved from the second position to the first position.

8. The apparatus of claim 1 further including a dumping type body mounted on said main frame of said work vehicle and a tailgate pivotally attached to said dumping type body.

9. The apparatus of claim 8 wherein said tag axle assembly, said pneumatic means for moving said tag axle assembly and said pneumatic means for applying a variable downward force are all mounted to said tailgate.

10. For a work vehicle having a main frame:
    (a) a tag axle assembly which includes a pair of arms pivotally mounted to the vehicle, at least one tag axle, at least one tag wheel and a cross members,
    (b) pneumatic means for moving the tag axle assembly between a first position in which the tag wheels elevated and a second position in which the tag wheels engage the ground; and
    (c) pneumatic means for applying a variable downward force on the tag wheels when the tag wheels engage the ground, said means for applying a variable downward force including:
    (i) at least one link arm having one end pivotally fixed to and projecting rearwardly from said vehicle and a cam roller associated with the other end of said arm;
    (ii) an air spring, and
    (iii) a cam plate projecting from the cross member of the tag axle assembly having at least one surface which engages the cam roller of the arm so that the arm, air spring and cam plate cooperate to cause said variable downward force to be applied to the tag wheels, said cam plate also being shaped so that the cam plate, cam roller and air spring cooperate to prevent the tag wheels from dropping below a certain predetermined position relative to the main frame of the vehicle.

11. The apparatus of claim 10 where said means for moving the tag axle assembly includes a pneumatic actuator fixed to the vehicle, a pivot member secured to the cross member of the tag axle assembly, and an elongated member secured at one end to the pneumatic actuator and at its other end to said pivot member for transferring force from the pneumatic actuator to the pivot member so that the pivot member, elongated member and pneumatic actuator cause the tag axle assembly to move to said first position when said pneumatic actuator is inflated with air.

12. The apparatus of claim 11 wherein said elongated member is a stiff elongated arm.

13. The apparatus of claim 11 wherein said elongated member is a cable.

14. The apparatus of claim 10 further including means for stopping and retaining the tag axle assembly in an intermediate position between said first and said second position when the tag wheels are moved from the second position to the first position.

15. The apparatus of claim 10 further including a dumping type body mounted on said main frame of said work vehicle and a tailgate pivotally attached to said dumping type body.

16. The apparatus of claim 15 wherein said tag axle assembly, said pneumatic means for moving said tag axle assembly and said pneumatic means for applying a variable downward force are all mounted to said tailgate.

17. For a work vehicle having a main frame,
   (a) a tag axle assembly which includes a pair of arms pivotally mounted to the vehicle, at least one tag axle, at least one tag wheel and a cross member;
   (b) pneumatic means for moving the tag axle assembly between a first position in which the tag wheels are elevated and a second position in which the tag wheels engage the ground; and
   (c) pneumatic means for applying a variable downward force on the tag wheels when the tag wheels engage the ground, said means for applying a variable downward force including:
      (i) a lever arm fixed at one end to said cross member and having a pin projecting from its other end;
      (ii) a cam plate having a hook for receiving said pin;
      (iii) a pair of air springs; and
      (iv) a cam arm associated with each air spring for joining said air spring to said cam plate so that the air springs, cam arms, cam plate and lever arm cooperate to apply the variable downward force upon said tag wheels when said air springs are inflated with air.

18. The apparatus of claim 19 where said means for moving the tag axle assembly includes a pneumatic actuator fixed to the vehicle, a pivot member secured to the cross member of the tag axle assembly, and an elongated member secured at one end to the pneumatic actuator and at its other end to said pivot member for transferring force from the pneumatic actuator to the pivot member so that the pivot member, elongated member and pneumatic actuator cause the tag axle assembly to move to said first position when said pneumatic actuator is inflated with air 19. The apparatus of claim 18 wherein said elongated member is a stiff elongated arm.

20. The apparatus of claim 18 wherein said elongated member is a cable.

21. The apparatus of claim 17 further including means for stopping and retaining the tag axle assembly in an intermediate position between said first and said second position when the tag wheels are moved from the second position to the first position.

22. The apparatus of claim 17 further including a dumping type body mounted on said main frame of said work vehicle and a tailgate pivotally attached to said dumping type body.

23. The apparatus of claim 22 wherein said tag axle assembly, said pneumatic means for moving said tag axle assembly and said pneumatic means for applying a variable downward force are all mounted to said tailgate.

24. A work vehicle having:
   (a) a main frame;
   (b) a dumping type body mounted on said main frame;
   (c) a tailgate pivotally attached to said dumping type body;
   (d) a tag axle assembly including a pair of arms pivotally attached to said tailgate, at least one tag axle, at least one tag wheel and a cross member;
   (e) pneumatic means mounted to the tailgate for moving the tag axle assembly between a first position in which the tag wheels are elevated and a second position in which the tag wheels engage the ground;
   (f) pneumatic means mounted to the tailgate for applying a variable downward force on the tag wheels when the tag wheels engage the ground.

* * * * *

UNITED STATES PATENT AND TRADEMARK OFFICE
CERTIFICATE OF CORRECTION

PATENT NO. : 5,018,755

DATED : May 28, 1991

INVENTOR(S) : Garwin McNeilus, et al.

It is certified that error appears in the above-identified patent and that said Letters Patent is hereby corrected as shown below:

In column 10, line 38, "members" should read -- member -- .

In column 10, line 40, after "wheels", insert -- are -- .

In column 12, line 1, "19" should read -- 17 --.

Signed and Sealed this

Twenty-fourth Day of November, 1992

Attest:

DOUGLAS B. COMER

Attesting Officer

Acting Commissioner of Patents and Trademarks